United States Patent [19]

Kawachi et al.

[11] Patent Number: 4,931,511
[45] Date of Patent: Jun. 5, 1990

[54] CROSS-LINKABLE COATING COMPOSITION

[75] Inventors: Shoji Kawachi, Nishinomiya; Masayasu Tomoda; Masahiko Oka, both of Otsu; Yasuyoshi Furukawa, Neyagawa; Hiroyuki Tanaka, Settsu, all of Japan

[73] Assignee: Daikin Industries, Ltd., Osaka, Japan

[21] Appl. No.: 245,669

[22] Filed: Sep. 16, 1988

[30] Foreign Application Priority Data

Sep. 17, 1987 [JP] Japan .................. 62-235971

[51] Int. Cl.$^5$ .................. C08F 8/00; C08F 16/24
[52] U.S. Cl. .................. 525/326.3; 526/247
[58] Field of Search .................. 526/247; 525/326.3

[56] References Cited

FOREIGN PATENT DOCUMENTS

| | | | |
|---|---|---|---|
| 0077998 | 5/1983 | European Pat. Off. | 526/247 |
| 0093404 | 11/1983 | European Pat. Off. | 526/247 |
| 0219065 | 4/1987 | European Pat. Off. | 526/247 |
| 62-012734 | 10/1986 | Japan . | |
| 61-223007 | 10/1986 | Japan | 526/247 |
| 62-230804 | 10/1987 | Japan | 526/247 |
| 1038189 | 8/1966 | United Kingdom | 526/247 |

Primary Examiner—Joseph L. Schofer
Assistant Examiner—N. Sarofim
Attorney, Agent, or Firm—Birch, Stewart, Kolasch & Birch

[57] ABSTRACT

A cross-linkable coating composition comprising a fluorine-containing elastomeric copolymer which comprises (a) 50 to 95% by mole of repeating units derived from a fluoroolefin of the formula:

$$CF_2=CXY \qquad (I)$$

wherein X and Y are the same or different and a fluorine atom or a chlorine atom, (b) 50 to 5% by mole of repeating units derived from a perfluorovinyl ether of the formula:

$$R_f-[OCFZCF_2(CF_2)_m]_n-OCF=CF_2 \qquad (II)$$

wherein $R_f$ is a $C_1$–$C_6$ perfluoroalkyl group, Z is a fluorine atom or a trifluoromethyl group, n is an integer of 0 to 5 and m is 0 to 1 provided that when m is 1 (one), X is not a trifluoromethyl group and a cross-linking agent for the copolymer, the copolymer and the cross-linking agent being dissolved or dispersed in a fluorosolvent is provided.

10 Claims, No Drawings

CROSS-LINKABLE COATING COMPOSITION

BACKGROUND OF THE INVENTION

1. Field of the Invention

The present invention relates to a cross-linkable coating composition comprising a fluorine-containing elastomeric copolymer.

2. Description of the Related Art

A copolymer of a fluoroolefin of the formula:

$$CF_2=CXY \quad (I)$$

wherein X and Y are the same or different and a fluorine atom of a chlorine atom and a perfluoro(alkyl vinyl ether) provides a wide variety of materials from a resinous one to an elastomeric one. The copolymer of this kind can be molded to form mechanical parts such as O-rings, flange seals, gasket stocks, pump diaphragms and liners and is particularly useful when special resistances against heat and/or corrosive liquids are required.

Although the elastomeric copolymer has excellent liquid resistance, it is very expensive so that it is not economical to produce a whole article from the elastomeric copolymer. If the elastomeric copolymer were formulated in the form of a coating composition and applied on a surface of an article, it would find more and more application fields. However, there are known few solvents in which the fluorine-containing elastomeric copolymers can be dissolved or dispersed.

SUMMARY OF THE INVENTION

An object of the present invention is to provide a cross-linkable coating composition comprising a fluorine-containing elastomeric copolymer.

This and other objects of the present invention are achieved by a cross-linkable coating composition comprising a fluorine-containing elastomeric copolymer which comprises (a) 50 to 95% by mole of repeating units derived from a fluoroolefin of the formula:

$$CF_2=CXY \quad (I)$$

wherein X and Y are the same or different and a fluorine atom or a chlorine atom, (b) 50 to 5% by mole of repeating units derived from a perfluorovinyl ether of the formula:

$$R_f-[OCFZCF_2(CF_2)_m]_n-OCF=CF_2 \quad (II)$$

wherein $R_f$ is a $C_1-C_6$ perfluoroalkyl group, Z is a fluorine atom or a trifluoromethyl group, n is an integer of 0 to 5 and m is 0 or 1 provided that when m is 1 (one), X is not a trifluoromethyl group and a cross-linking agent for the copolymer, the copolymer and the cross-linking agent being dissolved or dispersed in a fluorosolvent.

The fluorine-containing elastomeric copolymer to be used according to the present invention may comprise, in addition to the repeating units (a) and (b), (c) 0.1 to 5% by mole, based on the total amounts of the repeating units (a) and (b), of repeating units derived from a cross-linking site providing monomer of the formula:

$$ICH_2CF_2CF_2-(OCH_2CF_2CF_2)_p-(OCFZCF_2)_q-OCF=CF_2 \quad (II)$$

wherein Z is the same as defined above, and p and q are each an integer of 0 to 2.

The copolymer to be used according to the present invention may further comprises at least one of other ethylenically unsaturated fluorine-containing monomers. Examples of such other monomers are trifluoroethylene, vinylidene fluoride, vinyl fluoride, chlorotrifluoroethylene, hexafluoropropylene, pentafluoropropylene, hexafluoroisobutene, perfluorocyclobutene, perfluoro(methylcyclopropylene), perfluoroallene, α,β,β-trifluorostyrene, perfluorostyrene, perfluoro(alkyl vinyl ethers) (e.g. perfluoro(methyl vinyl ether) and perfluoro(propyl vinyl ether)), polyfluoroacrylic acid, polyfluorovinyl acetic acid, polyfluorovinyl ether sulfonic acid, polyfluorodienes and the like. When the other ethylenically unsaturated fluorine-containing monomer is contained in the copolymer, its amount is from 0.1 to 20% by mole based on the total amount of the repeating units (a) and (b) and the optional repeating units (c).

Although some of the fluorine-containing elastomeric copolymers to be used according to the present invention are known, others are novel. Most of the copolymers are disclosed in, for example, Japanese Patent Kokai Publication No. 12734/1987 and Copending U.S. Patent Application Ser. No. 185,916 filed on Aug. 25, 1988 or European Patent Application No. 88 106 587.4 filed on Apr. 25, 1988.

The polymerization method of the copolymer is described in the above publication or applications in detail and repeated hereinbelow:

The polymerization can be carried out by bulk, suspension or solution polymerization and also by emulsion polymerization which is carried out by using a water or oil soluble peroxide in the presence of a perfluoroemulsifier. Examples of the solvent to be used in the solution polymerization are highly fluorinated solvents such as dichlorodifluoromethane, trichlorofluoromethane, chlorodifluoromethane, 1,1,2-trichloro-1,2,2-trifluoroethane, 1,2-dichloro-1,1,2,2-tetrafluoroethane, 1,1,2,2-tetrachloro-1,2-difluoroethane, perfluorocyclobutane and perfluorodimethylcyclobutane.

A molecular weight of the copolymer can be adjusted by the addition of a chain transfer agent, although it may be adjusted by controlling a relationship between a polymerization rate and an amount of a polymerization initiator. Specific examples of the chain transfer agent are hydrocarbons having 4 to 6 carbon atoms, alcohols, ethers, organic halides (e.g. $CCl_4$, $CBrCl_3$, $CF_2BrCFBrCF_3$ and $CF_2I_2$). When a fluorocarbon iodide such as $CF_2I_2$, $I(CF_2)I$ or $CF_2=CFCF_2CF_2I$ is used as the chain transfer agent, since the iodine atom bonded to the chain terminal is still active, the copolymer can be cross linked with a peroxide as a radical source in the presence of a polyfunctional unsaturated compound such as triallylisocyanurate and triallylcyanurate.

The polymerization temperature depends on a decomposition temperature of the polymerization initiator and is preferably from 0° to 100° C. The polymerization pressure is generally from 0 to 50 kg/cm²G.

As the fluorosolvents, fluorine-containing organic solvents can be used. Among them, perfluorosolvents are preferred. Examples of the perfluorosolvents are perfluoro-tert.-amines (e.g. perfluorotri-n-butylamine and perfluorotriethylamine), perfluoro(substituted tetrahydrofuran), perfluorobenzene and the like.

As the cross-linking agent, any of the conventionally used ones which are used for cross-linking fluororubbers can be used. Among them, organic peroxides are preferred. An amount of the organic peroxide is from 0.05 to 10 parts by weight, preferably from 1.0 to 5 parts by weight per 100 parts by weight of the copolymer.

The organic peroxide is generally a peroxide which generates a peroxy radical by heating or in the presence of a redox system. Examples of such peroxide are 1,1-bis-(tert.-butylperoxy)-3,5,5-trimethylcyclohexane, 2,5-dimethylhexane-2,5-dihydroperoxide, di-tert.-butylperoxide, tert.-butylcumylperoxide, dicumylperoxide, α,α'-bis(tert.-butylperoxy)-p-diisopropylbenzene, 2,5-dimethyl-2,5-di-(tert.-butylperoxy)hexane, 2,5-dimethyl-2,5-di(tert.-butylperoxy)hexyne-3, benzoylperoxide, tert.-butylperoxybenzene, 2,5-dimethyl-2,5-di(benzoylperoxy)hexane, tert.-butyl peroxymaleate, tert.-butylperoxyisopropyl carbonate and the like. Among them, the dialkyl type peroxides are preferred. The kind and amount of the peroxide depend on an amount of active —O—O— groups, its decomposition temperature and so on.

When the organic peroxide is used for cross linking of the copolymer, co-use of a cross linking aid or co-cross linking agent will promote the curing of the copolymer. Any of the cross linking aid or co-cross linking agent which has a reaction activity with both the peroxy radical and the polymer radical can be used. Preferred examples of the cross linking aid or co-cross linking agent are triallyl cyanurate, triallyl isocyanurate, triacryl formal, triallyl trimellitate, N,N'-m-phenylenebismaleimide, dipropargyl terephthalate, diallyl phthalate, tetraallyl terephthalate, triallyl phosphate and the like. The amount of the cross linking aid or co-cross linking agent is from 0.1 to 10 parts by weight, preferably from 0.5 to 5 parts by weight based on 100 parts by weight of the copolymer.

To prevent phase separation between the the fluorine-containing elastomeric copolymer and the cross-linking agent, particularly the organic peroxide, an adsorptive filler is preferably added to the coating composition. Examples of such filler are carbon black, $SiO_2$ and clay.

Since the fluorosolvent is expensive, it is not economical to use this solvent to dilute the coating composition to a suitable concentration of the copolymer. It is preferable to use a halogenated hydrocarbon solvent as a diluent. In the halogenated hydrocarbon solvent alone, the fluorine-containing elastomeric copolymer cannot be dissolved or dispersed. But, once the fluorine-containing elastomeric copolymer is dissolved or dispersed in the fluorosolvent, the coating composition can be diluted with the halogenated hydrocarbon solvent.

The coating composition of the present invention may contain any conventional additive such as a pigment for coloring the coating, a filler and a reinforcing material. Specific examples of the generally used filler and/or reinforcing material are inorganic materials such as carbon black, $TiO_2$, $SiO_2$, clay and talc and organic materials such as fluoropolymers (e.g. polytetrafluoroethylene, polyvinylidene fluoride, polyvinyl fluoride, polychlorotrifluoroethylene, tetrafluoroethylene/ethylene copolymer, tetrafluoroethylene/vinylidene fluoride copolymer, etc.).

The coating composition of the present invention may be easily prepared by adding the fluorine-containing elastomeric copolymer in the fluorosolvent and mixing them.

A concentration of the copolymer is from 5 to 70% by weight, preferably from 10 to 40% by weight based on the total weight of the composition.

The coating composition of the present invention can be applied on a substrate by any of conventional application methods such as dip coating, flow coating, spray coating, brush coating and the like. After the application of the composition, the solvent is evaporated, and the fluorine-containing elastomeric copolymer is cross-linked.

The cross-linking temperature and time depends on the kinds of the cross-linking agent. Generally, it is cross-linked by oven cured at a temperature of 150° to 250° C. for 1 to 24 hours.

PREFERRED EMBODIMENTS OF THE INVENTION

The present invention will be illustrated by following Examples.

EXAMPLE 1

Daiel (a trade name) GA-50 (a perfluororubber cross-linking composition containing a peroxide, a cross-linking aid, carbon black and the like manufactured by Daikin Industries, Ltd.) (20 g) and tri-n-perfluorobutylamine (80 g) were charged in a glass containing and shaken by a tumbling mixer for one day to dissolve the copolymer in the solvent.

The resulting solution was applied on an aluminum plate which had been degreased with trichlorotrifluoroethane and dried, and then vulcanized in a steam vulcanizer at 150° C. for 60 minutes.

The formed film had acetone repellency.

EXAMPLE 2

To 100 parts by weight of the solution prepared in Example 1, 100 parts by weight of trichlorotrifluoroethane was added to dilute the solution. Then, the diluted solution was spray coated on an aluminum plate which had been degreased with trichlorotrifluoroethane. It had good spryability.

EXAMPLE 3

In the same manner as in Example 1 or 2 but using perfluorobenzene in place of tri-n-perfluorobutylamine, a coating composition was prepared. The resulting composition had substantially the same properties as that prepared in Example 1 or 2.

What is claimed is:

1. A cross-linkable coating composition comprising a fluorine-containing elastomeric copolymer which comprises (a) 50 to 95% by mole of repeating units derived from a fluoroolefin of the formula:

$$CF_2=CXY \qquad (I)$$

wherein X and Y are the same or different and are each a fluorine atom or a chlorine atom, (b) 50 to 5% by mole of repeating units derived from a perfluorovinyl ether of the formula:

$$R_f-[OCFZCF_2(CF_2)_m]_n-OCF=CF_2 \qquad (II)$$

wherein $R_f$ is a $C_1$-$C_6$ perfluoroalkyl group, Z is a fluorine atom or a trifluoromethyl group, n is an integer of 0 to 5 and m is 0 or 1 provided that when m is 1 (one), X is not a trifluoromethyl group and a cross-linking agent for the copolymer, the copolymer and the cross-linking agent being dissolved or dispersed in a perfluorosolvent.

2. The cross-linkable coating composition according to claim 1, wherein the copolymer further comprises (c) 0.1 to 5% by mole, based on the total amounts of the repeating units (a) and (b), of repeating units derived from a cross-linking site providing monomer of the formula:

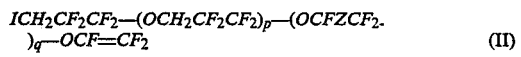

$$ICH_2CF_2CF_2-(OCH_2CF_2CF_2)_p-(OCFZCF_2)_q-OCF=CF_2 \quad (II)$$

wherein Z is the same as defined above, and p and q are each an integer of 0 to 2.

3. The cross-linkable coating composition according to claim 1, wherein the cross linking agent is an organic peroxide.

4. The cross-linkable coating composition according to claim 1, which further comprises at least one adsorptive filler selected from the group consisting of carbon black, $SiO_2$ and clay.

5. The cross-linkable coating composition according to claim 1, which further comprises a halogenated hydrocarbon solvent as a diluent.

6. The cross-linkable coating composition according to claim 1, wherein the perfluorosolvent is a perfluoro-tert.-amine.

7. The cross-linking coating composition according to claim 1, wherein the copolymer further comprises 0.1 to 20% by mole of repeating units derived from at least one other ethylenically unsaturated fluorine-containing monomer based on the total mole of the repeating units (a) and (b).

8. The cross-linking coating composition according to claim 2, wherein the copolymer further comprises 0.1 to 20% by mole of repeating units derived from at least one other ethylenically unsaturated fluorine-containing monomer based on the total mole of the repeating units (a), (b) and (c).

9. The cross-linkable coating composition according to claim 1, wherein the concentration of the copolymer is from 5 to 70% by weight based on the total weight of the composition.

10. The cross-linkable coating composition according to claim 1, wherein the concentration of the copolymer is from 10 to 40% by weight based on the total weight of the composition.

* * * * *